(12) United States Patent
Chiang et al.

(10) Patent No.: US 8,568,009 B2
(45) Date of Patent: Oct. 29, 2013

(54) COMPACT HIGH BRIGHTNESS LED AQUARIUM LIGHT APPARATUS, USING AN EXTENDED POINT SOURCE LED ARRAY WITH LIGHT EMITTING DIODES

(75) Inventors: Brian I-Yuan Chiang, El Sobrante, CA (US); Junying Jonathan Lu, Castro Valley, CA (US); Ho-Shang Lee, El Sobrante, CA (US)

(73) Assignee: Dicon Fiberoptics Inc., Richmond, CA (US)

( * ) Notice: Subject to any disclaimer, the term of this patent is extended or adjusted under 35 U.S.C. 154(b) by 245 days.

(21) Appl. No.: 13/023,445

(22) Filed: Feb. 8, 2011

(65) Prior Publication Data

US 2012/0044713 A1    Feb. 23, 2012

Related U.S. Application Data

(63) Continuation-in-part of application No. 12/860,760, filed on Aug. 20, 2010.

(51) Int. Cl.
| | |
|---|---|
| *H05B 35/00* | (2006.01) |
| *F21V 9/16* | (2006.01) |
| *F21V 13/14* | (2006.01) |
| *F21V 21/092* | (2006.01) |
| *F21V 33/00* | (2006.01) |

(52) U.S. Cl.
USPC .......... 362/563; 362/1; 362/84; 362/101; 362/231; 362/245; 362/249.02; 362/249.05; 362/397; 362/800; 362/805

(58) Field of Classification Search
USPC ......... 362/101, 230, 231, 318, 397, 554, 562, 362/563, 1, 2, 84, 234, 245–247, 249.02, 362/249.05, 260, 800, 805; 47/17, 58.1 LS
See application file for complete search history.

(56) References Cited

U.S. PATENT DOCUMENTS

| | | | |
|---|---|---|---|
| 5,012,609 A | 5/1991 | Ignatius et al. | |
| 5,165,778 A * | 11/1992 | Matthias et al. | ............. 362/101 |
| 5,687,062 A | 11/1997 | Larson | |
| 5,715,040 A | 2/1998 | Iba | |
| 6,504,301 B1 | 1/2003 | Lowery | |

(Continued)

OTHER PUBLICATIONS

U.S. Office Action for U.S. Appl. No. 12/860,760 mailed Sep. 27, 2012, 21 pages.

(Continued)

*Primary Examiner* — Alan Cariaso
(74) *Attorney, Agent, or Firm* — Davis Wright Tremaine LLP

(57) ABSTRACT

A compact high-brightness LED aquarium light fixture is described for use in illuminating aquarium tanks artificial light. (18) The LED aquarium light uses a densely-packed array of high-brightness light emitting diodes (LEDs) that are not individually packaged, where the array behaves similarly to a point source of light. The LED chips are distributed laterally over an area, where the LED chips have light emitting surfaces for emitting light in directions transverse to said area, wherein the dimensions of the area do not exceed 25 mm. Adjacent chips of the array are preferably separated by less than about 0.2 mm. The extended point source LED array, with its lens and associated reflector, result in a concentrated light source that attractively illuminates the contents of the aquarium, and creates a desirable shimmering effect within the aquarium. A clamp-on, flexible gooseneck mounting arrangement allows for use with aquarium tanks of various sizes.

35 Claims, 13 Drawing Sheets

(56) References Cited

U.S. PATENT DOCUMENTS

| | | | |
|---|---|---|---|
| 6,554,450 | B2 | 4/2003 | Fang et al. |
| 6,659,622 | B2 | 12/2003 | Katogi et al. |
| 6,809,347 | B2 * | 10/2004 | Tasch et al. .................. 257/103 |
| 6,860,619 | B2 * | 3/2005 | Swanson .................. 362/249.11 |
| 6,921,182 | B2 | 7/2005 | Anderson et al. |
| 7,140,751 | B2 | 11/2006 | Lin |
| 7,173,383 | B2 | 2/2007 | Vornsand et al. |
| 7,220,018 | B2 | 5/2007 | Crabb et al. |
| 7,543,952 | B1 * | 6/2009 | Chang ........................ 362/101 |
| 7,549,772 | B2 | 6/2009 | Wang |
| 7,676,915 | B2 | 3/2010 | Ter-Hovhannissian |
| 7,722,211 | B2 | 5/2010 | Marra et al. |
| 7,771,088 | B2 | 8/2010 | Chen |
| 7,893,445 | B2 | 2/2011 | van de Ven et al. |
| 8,038,319 | B2 | 10/2011 | Bailey |
| 8,057,060 | B2 * | 11/2011 | Fredricks .................... 362/101 |
| 8,508,127 | B2 | 8/2013 | Negley et al. |
| 2007/0058368 | A1 | 3/2007 | Partee et al. |
| 2007/0253196 | A1 * | 11/2007 | Ormiston .................... 362/231 |
| 2008/0218995 | A1 * | 9/2008 | Gilkey et al. ............... 362/101 |
| 2009/0080184 | A1 | 3/2009 | Kobilke |
| 2009/0190363 | A1 * | 7/2009 | McDonnell et al. .......... 362/396 |
| 2009/0288340 | A1 | 11/2009 | Hess |
| 2009/0315062 | A1 | 12/2009 | Su et al. |

OTHER PUBLICATIONS

U.S. Final Office Action for U.S. Appl. No. 12/860,760 mailed Dec. 17, 2012, 23 pages.

Koninklijke Philips Electronics N.V., "Intellectual Property & Standards, Licensing Programs, LED-based Luminairies and Retrofit Bulbs", Nov. 11, 2010; www.ip.philips.com/services, 2 pages.

Koninklijke Philips Electronics N.V., "Philips Color Kinetics Core LED Lighting Technologies", Nov. 11, 2010; www.colorkinetics.com/technologies/core, 2 pages.

Notice of Allowance and Fees Due for U.S. Appl. No. 12/860,760 mailed Jun. 24, 2013, 9 pages.

U.S. Office Action for U.S. Appl. No. 13/216,085 mailed Sep. 9, 2013, 23 pages.

Notice of Allowance and Fees Due for U.S. Appl. No. 13/088,033 mailed Sep. 18, 2013, 13 pages.

* cited by examiner

FIG. 4A
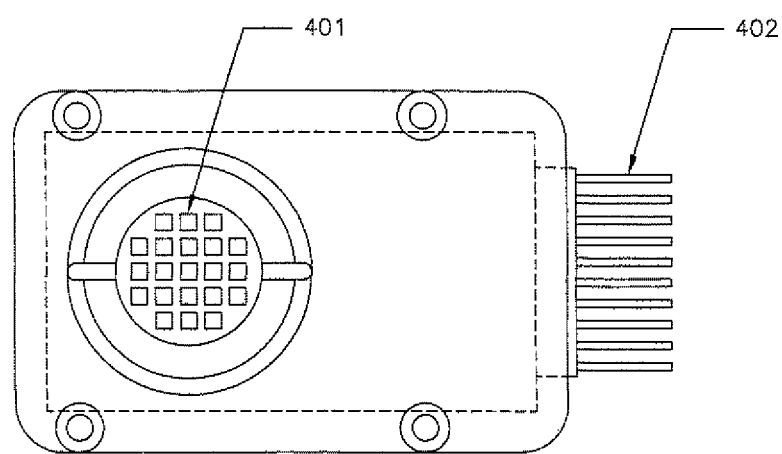
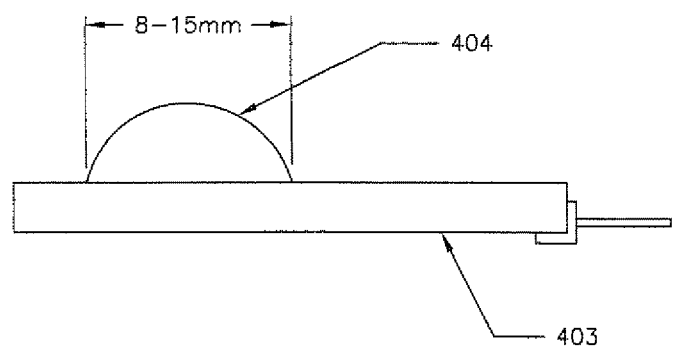
FIG. 4B

AQUARIUM LIGHT

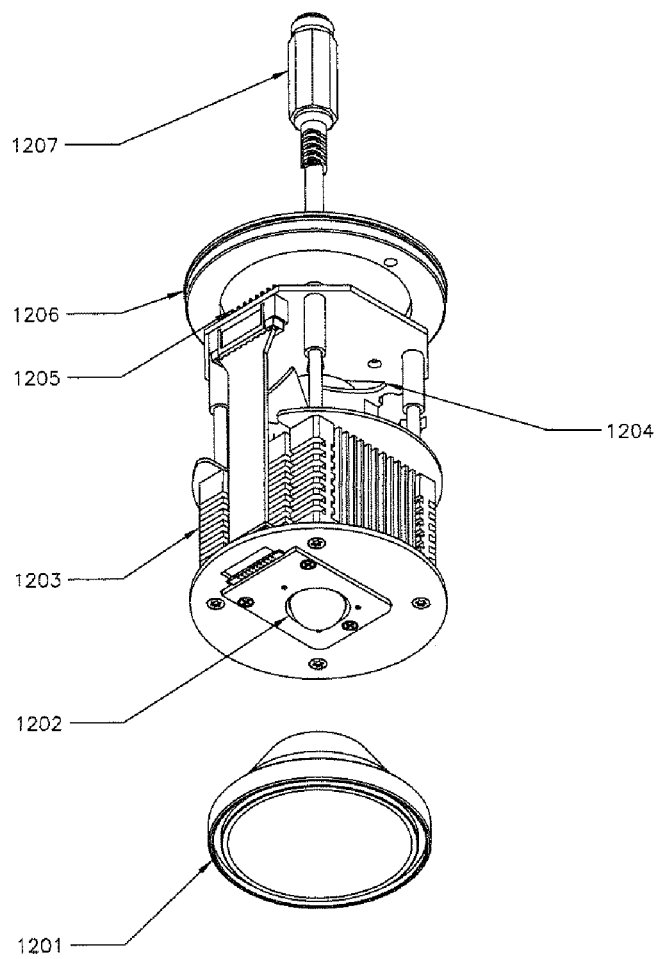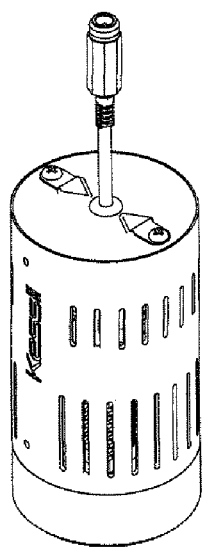
FIG. 12
FIG. 13

COMPACT HIGH BRIGHTNESS LED AQUARIUM LIGHT APPARATUS, USING AN EXTENDED POINT SOURCE LED ARRAY WITH LIGHT EMITTING DIODES

CROSS-REFERENCE TO RELATED APPLICATIONS

This application is a continuation-in-part of U.S. application Ser. No. 12/860,760, entitled "COMPACT HIGH BRIGHTNESS LED GROW LIGHT APPARATUS, USING AN EXTENDED POINT SOURCE LED ARRAY WITH LIGHT EMITTING DIODES," filed Aug. 20, 2010. This application is related to U.S. patent application Ser. No. 12/145,395, entitled "A LIGHT EMITTING DIODE SUBMOUNT WITH HIGH THERMAL CONDUCTIVITY FOR HIGH POWER OPERATION," filed Jun. 24, 2008. Both applications are hereby incorporated by reference herein, as if fully set forth herein.

BACKGROUND

The present invention relates generally to electrical lamp fixtures used for illuminating aquariums and stimulating the growth of marine life, and specifically to an improved, compact light emitting diode (LED) aquarium light apparatus, incorporating an extended point source LED array (preferably composed of high brightness LEDs of multiple wavelengths) that provides spatially and spectrally controlled light.

Typical aquarium lights utilize either fluorescent bulbs, halogen incandescent bulbs, or metal halide (MH) incandescent bulbs. The primary purpose of most aquarium lights is to provide an attractive illumination of the aquarium tank and its contents, for viewing. In addition, aquarium lights also support the growth of marine life, including marine plants, coral, and potentially algae. The objectives and preferred characteristics of light sources for achieving these two broad purposes can be substantially different, and the different types of light sources used in existing aquarium lights have differing advantages and disadvantages in meeting these objectives.

The preferred characteristics of a light source intended for providing an attractive source of illumination for viewing an aquarium, include a spectral content that is reasonably close to that of natural sunlight, including having a high color rendering index (CRI). The desired spectral content is often intended to reflect the blue shift (or reduction of longer-wavelength red light) that occurs as sunlight passes through water. This results in a natural appearance for fish and other marine life in the aquarium. Some aquarium owners and tropical fish enthusiasts also place value on a light source or lighting system in which the nature of the light can be varied over time, to mimic the differences in sunlight at different times of day, and also to provide light that mimics natural moonlight during the evening.

Another key attribute for aquarium viewing is the spatial distribution of the light from the light source. Light that appears to emanate from a point source, or an approximation of a point source, creates a more natural "shimmering" effect within the aquarium, when the surface of the water is rippled. This effect is created when light emanating from a point source casts shadows of the ripples. This shimmering effect can be observed on the floor or bottom surface of the aquarium, and on the objects within the aquarium. In contrast, a light source that is broadly distributed over the top of the aquarium will result in a blurring of the shimmering effect, with far less contrast. This is similar to the observation that natural sunlight (which emanates from a near point source) creates very sharp and distinct shadows, whereas a distributed light source creates either multiple shadows, or highly-blurred and indistinct shadows. This is because sunlight illuminates an area from only one direction to create distinct shadows, whereas light from a broadly distributed light source will illuminate the area from different directions, thereby causing a blurring of the shadows, or even obliterating the shadows altogether. Existing aquarium light sources that approximate a point source of light, such as a single incandescent bulb, therefore provide an attractive shimmering effect, whereas more distributed light sources, such as a long fluorescent tube, do not provide an attractive shimmering effect.

The preferred characteristics of a light source intended for growing marine life such as marine plants, algae, and coral, are somewhat different from the characteristics that are desired for aquarium viewing. Different types of marine life will prefer different specific wavelengths of light, both in terms of encouraging growth, and also in terms of encouraging specific behaviors and effects. It may also be beneficial to be able to vary the spectral content of the light source over time, either to mimic the day-night cycle, or possibly to mimic longer-term cycles such as the lunar month, as well as seasonal variations that occur in nature. In terms of the light source's spatial distribution, the preferred characteristics include high intensity, as well as uniformity of both the spectral content and intensity over a reasonably large area.

It is also desirable for an aquarium light to have a compact form factor, so that the light does not cover a high percentage of the top of the aquarium tank. An aquarium light with a compact form factor will provide less-obstructed viewing of the aquarium from above, and will also make activities such as feeding, tank cleaning, and other aquarium maintenance tasks, less difficult. Other desirable attributes for a preferred aquarium light include low cost, low electrical power consumption, low or reduced heat generation, high reliability, and long life.

Existing aquarium lights and aquarium light source technologies have different advantages and disadvantages, for the dual purposes of providing an attractive source of illumination for aquarium viewing, and encouraging the growth of marine life. Fluorescent bulbs, as well as incandescent bulbs, such as halogen and metal halide light sources, provide a fairly broad spectrum of light, and can provide good or at least acceptable color rendering. However, their spectral content is fixed. Thus, varying the spectral content over time is not possible, unless multiple bulb types are incorporated into the light. It is also not possible to tailor the spectral content to emphasize the specific wavelengths that might be optimal for the growth of marine life. It is also true that incandescent bulbs in particular (and fluorescent bulbs to a lesser extent) may produce significant quantities of radiated infrared energy, which serves to heat the water in the aquarium. This may require a cooling apparatus for the water in the aquarium tank, which in turn adds to the energy, costs of the aquarium.

In terms of spatial distribution, incandescent bulbs can be configured to approximate a point source, and therefore can provide an attractive shimmering effect. However, fluorescent bulbs typically provide a more distributed light pattern, and do not provide attractive shimmering. As a result of these differences in characteristics, some aquarium light fixtures incorporate both incandescent and fluorescent bulbs, to be used at different times for differing purposes. As just one example, the incandescent bulb(s) might be used for simulating daylight (perhaps in combination with fluorescent bulbs), whereas a dimmer fluorescent bulb might be used to simulate moonlight.

Aquarium lights using Light Emitting Diodes offer a number of potential advantages over fluorescent or incandescent bulbs. Many of these general advantages are described in prior art patent U.S. Pat. No. 7,220,018 B2, "MARINE LED LIGHTING SYSTEM AND METHOD." First and foremost of the general advantages of LED aquarium lights is that individual LEDs emit light over a narrow range of wavelengths. By combining multiple LEDs of specific wavelengths, it is possible to tailor the overall spectral content of the light source, for either a particular visual appearance, or for encouraging the growth of marine life. If the control electronics for the LED aquarium light are designed so that the brightness of different wavelength LEDs is separately controllable, then it is also possible to vary the spectral content of the overall LED light source as a function of time, to mimic the day-night cycle, or even the changes that occur in natural sunlight as a function of time-of-day. Since LED chips only emit light from their top surfaces, LED-based light sources tend to require simpler reflectors than incandescent or fluorescent bulbs. Other general benefits of LED aquarium lights include high efficiency, especially when compared to incandescent bulbs, as well as the lack of radiated IR energy that could excessively heat the water in the aquarium.

However, existing LED aquarium lights also suffer from several important disadvantages. The primary historical disadvantage of existing and prior art LED lights in general has been their relative lack of total light output, compared to fluorescent and incandescent light sources. Research in LEDs and solid-state lighting has resulted in the development of high brightness LEDs that efficiently produce relatively larger levels of light output, at higher electrical current levels. This has largely been achieved via advances in drawing heat away from the active junction of the LED, thereby allowing the LED to safely operate at these higher current levels. The electrical-to-optical conversion efficiency of LEDs is also being improved over time.

However, in order to provide a sufficient total light output, prior art LED aquarium lights require relatively large numbers of LEDs, which are typically spaced widely apart in order to deal with the resultant heat dissipation issues. The spacing between adjacent LEDs or LED chips in prior art LED aquarium lights is therefore an inch or more, and is typically several inches. This negates much of the potential size and cost advantages of an LED aquarium light. In order to achieve the light output of 20 or more LED chips, the surface area of the prior-art LED aquarium light must be relatively large. Also, each of the widely-spaced LED chips requires individual separate packaging, separate heat-sinking, and separate optics, thereby adding significantly to the size and cost of the aquarium light.

Typical practice in existing LED aquarium lights is to distribute a large number of individually-packaged LEDs along the length and width of a "light panel", or alternatively, along the length of a "light bar". This creates a highly distributed spatial light pattern, similar to that provided by the use of one or more long fluorescent tubes. This highly distributed light pattern blurs the shadows and does not provide the attractive shimmering visual effect that would result from a point source of light. Also, if multiple wavelengths of LEDs are being used to achieve a desirable spectral profile, the different wavelengths will be positioned at different locations along the light panel or light bar. This results in poor mixing of the light of different wavelengths from the spatially separated LEDs, causing different areas of the aquarium tank to receive light with differing spectral content. The large size of LED light panels and light bars also covers up a large portion of the top surface of the aquarium, blocking viewing of the aquarium from above, and blocking access for aquarium maintenance and other tasks.

SUMMARY

A compact, high brightness LED aquarium light apparatus comprises an array of multiple LED chips without individual packaging, wherein the LED chips are distributed laterally over an area. The LED chips have light emitting surfaces for emitting light in directions transverse to said area, wherein the dimensions of the area do not exceed 25 mm. The light emitted by the multiple LED chips as a whole preferably has a higher proportion in intensity in the blue region of the visible spectrum than light emitted by a black body radiator at 6500° Kelvin. The apparatus further includes an optical lens adjacent to the light emitting surfaces of the LED chips in said array. The optical lens collects and directs light emitted by the LED chips of the array towards the aquarium tank wherein spectrum of light emitted by the at least one array simulates filtering effect of water on natural light. The apparatus also includes a reflector surrounding said array. The reflector reflects the light emitted by the LED chips of the array towards the surface of the aquarium tank. Both the optical lens and reflector serve to attractively illuminate the contents of the aquarium tank, and to enhance the growth of marine life within the aquarium tank. The compact size of the apparatus supports a variety of mounting options that do not appreciably block access to the top of the aquarium tank, for viewing, and for aquarium maintenance tasks.

All patents, patent applications, articles, books, specifications, other publications, documents and things referenced herein are hereby incorporated herein by this reference in their entirety for all purposes. To the extent of any inconsistency or conflict in the definition or use of a term between any of the incorporated publications, documents or things and the text of the present document, the definition or use of the term in the present document shall prevail.

BRIEF DESCRIPTION OF THE DRAWINGS

FIG. 4A is a representation of one embodiment of the densely-packed LED array used in the present invention, with 21 LED chips. FIG. 4B is a side view of the LED array of FIG. 4A.

FIG. 12 shows the major sub-assemblies of one embodiment of the present invention.

FIG. 13 shows one embodiment of the present invention, in fully-assembled form, showing the outer housing.

DETAILED DESCRIPTION OF THE PREFERRED EMBODIMENTS

Figure 1A:
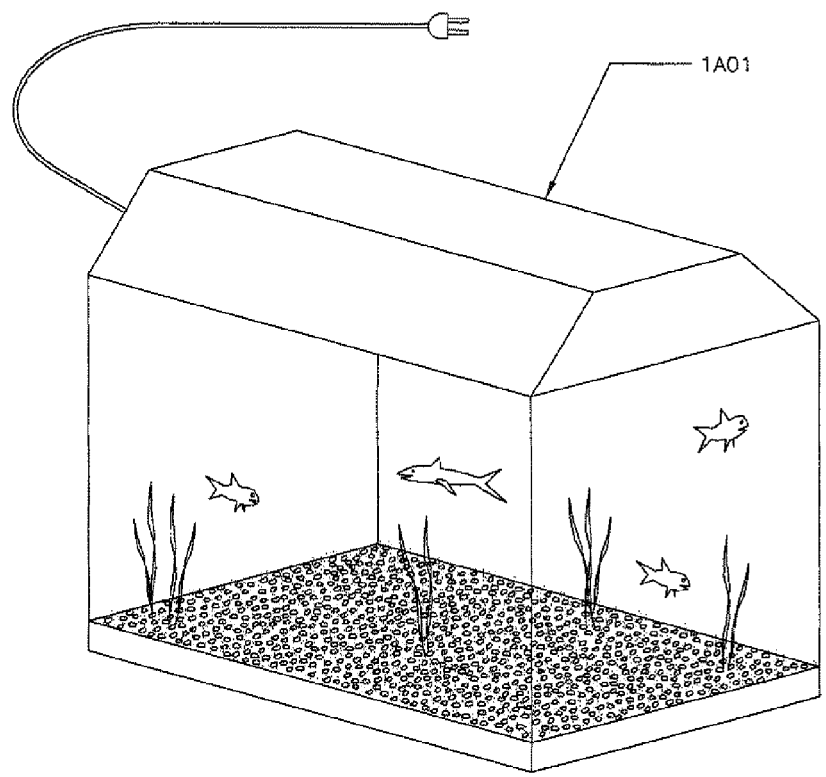
FIGS. 1A and 1B show one embodiment of the prior art in aquarium lights, using both fluorescent tubes and incandescent bulbs.

The embodiments of the present invention described hereinbelow of a compact, high brightness LED aquarium light, using an extended point source LED array made up of light emitting diodes of multiple wavelengths, address the disadvantages of prior art LED aquarium lights, while at the same time provide the advantages that are generally applicable to LED aquarium lights. The ideal LED aquarium light would be compact, and yet it would provide a very intense light. It would be very efficient at converting electrical energy into light energy that provides a visually attractive illumination of the aquarium tank and its contents, and is also maximally useful for encouraging the growth of marine life such as plants, algae, and coral, while providing minimal levels of light and heat energy that are not useful for these desired purposes. It would allow flexible customization of specific wavelengths and spectral content for promoting specific marine life growth patterns and behaviors, with dynamic control capabilities to vary its light output over time (both in terms of spectral content, as well as intensity). It would also offer flexible mounting options, to support a variety of aquarium styles and environments. It could be used as the sole source of light for the aquarium, or as a supplement for natural sunlight or other existing light sources. When used as a supplement for natural lighting, the ideal LED aquarium light would not block or shade the top surface of the aquarium to any great degree. The compact size of the ideal LED aquarium light would leave most of the top surface of the aquarium open and unblocked, both for viewing purposes, and also for activities such as feeding, tank cleaning, and other aquarium maintenance tasks. Other highly desirable attributes include low cost, low electrical power consumption, high reliability, and long life. While all of the above are desirable attributes, it will be understood that depending on the particular aquarium involved, not all of these attributes need to be present.

Prior art LED aquarium lights typically possess one or more significant shortcomings. In most cases these shortcomings are based on their use of large numbers of widely-spaced, separately packaged LEDs, as well as their use of simple control systems with little flexibility. Prior art LED aquarium lights are typically implemented as large light panels, typically two to four feet in length, depending on the length of the aquarium tank, or as long light bars, again with length dimensions of two or more feet. The light bar form implements a single row of widely-spaced, separately-packaged LEDs, and it is difficult to obtain sufficient light output, as well as an even, well-mixed, spatial distribution of light intensity. The light panel faint, by providing space for multiple rows of widely-spaced, separately-packaged LEDs, can provide more total light output, with a somewhat more even or uniform spatial distribution. However, the large panel form incurs additional cost, and also covers all or most of the top of the aquarium tank, limiting access to the top of the aquarium for viewing, as well as the feeding of aquarium fish, and aquarium maintenance tasks. Both the light bar and light panel forms typically suffer from the general disadvantages of high cost and relatively large size. Much of the cost and size disadvantage is directly due to the need to space the individual LED chips relatively far apart, with separate chip packaging, heat-sinking, and optics.

The present invention makes use of a dense array of multiple closely-spaced LED chips without individual packaging, which array acts as an extended point source of light. Instead of packaging each individual LED chip separately, a housing encloses the array of multiple LED chips as described below. The LED chips are distributed laterally over an area. The LED chips have light emitting surfaces for emitting light in directions transverse to said area, wherein the dimensions of the area do not exceed 25 mm. For example, the total diameter of the area over which the cluster of LED chips is distributed may be on the order of 8-25 mm, depending on the number of LED chips in the array, and the size of the LED chips. The spacing between individual adjacent LED chips is less than about 0.2 mm, such as on the order of a tenth of a millimeter, and not multiple inches, as is the case with prior art LED aquarium lights.

The array is preferably configured as multiple strings of LEDs, with each string containing multiple LED chips. Each string can be controlled separately, allowing for dynamic control of the brightness of each string, over time. Because each string contains multiple LED chips, the spectral content of each string of LEDs can be customized in terms of its spectral content. Because each string can be separately controlled, it is possible to vary the overall spectral content of the light output, over time. For example, in one embodiment of the present invention, some LED strings could be made up of various wavelengths of blue LEDs, whereas other LED strings of the same array could be made up using blue LED chips with fluorescent phosphors, to provide white light of different color temperatures. It is also possible to incorporate LEDs of other colors and wavelengths, including red and green. By controlling the brightness of the LED strings, the relative mix of blue, white, red, green, and other wavelengths can be varied. Within a given color range (for example, blue), instead of using a single type or wavelength of LED, it is possible to use several wavelength bands within that color portion of the spectrum, thereby providing a broader range of blue light than could be provided by single LEDs.

The small form factor of the LED array, and the close spacing of its LED strings and chips, results in a high intensity light from a small area. As such, the LED array behaves as an extended point source of light. In prior art LED aquarium lights, in which widely-spaced LEDs are each emitting a single, narrow-spaced range of wavelengths, the light from these multiple sources must be mixed via multiple sets of lenses and other optical elements, in order to achieve an even distribution of the light from the multiple sources (which might also be of multiple wavelengths). Even when such elaborate arrangement is used, light from these multiple sources cannot be satisfactorily mixed unless the prior art LED light sources are kept at an impractically large distance from the aquarium. With typical mounting locations for prior art LED aquarium lights, such as at within 1-3 feet from the aquarium, different locations within the aquarium will experience differing spectral content.

In contrast, the multiple LED chips in the LED array emits all or most of all of the desirable wavelengths from a single small-area array (with an effective diameter of only 8-25 mm, for example). The light as emitted from the LED array is therefore already well-mixed in terms of spectral content, even at very short distances from the aquarium, of less than about 1 foot. Since all of the LED chips in the LED array are covered by a single lens, with a diameter (e.g. about 30 mm for a 25 mm diameter LED array) that is only slightly larger than the diameter of the LED array, the cost and complexity of optics is greatly reduced. In other words, the optical lens has a principal plane, where dimensions of the optical lens along its principal plane are less than about 30 mm. Secondary optics, such as a reflector or secondary lens system, can be used to create a variety of light distribution patterns, dependent on both the intended area of illumination, as well as on the intended distance from the area to be illuminated. If the optics are designed to produce a fairly concentrated beam (e.g. a spot light), then the intensity of light will drop relatively slowly as a function of distance from the light source, resulting in greater penetration of light through the water of the aquarium, to the bottom of the tank. In other words, the lower portions of the aquarium tank will receive almost as much light energy as the upper portions of the tank, in a manner that is more consistent with natural sunlight. In applications where even greater light intensity is required, it is possible to use larger LED arrays containing a large number of LED chips.

The extended point source nature of the present invention also creates a desirable "shimmering" effect in the aquarium, if there is any motion or ripple on the surface of the water. This is similar to the shimmering effect created by natural sunlight, as the sun behaves approximately as a point source. Incandescent bulbs can also create this shimmering effect, if the bulb filament is sufficiently small. However, fluorescent bulbs and prior art LED aquarium lights do not produce this shimmering effect, because of their more distributed light pattern, which does not approximate a point source of light.

Thermal management is a key element of the design of the present invention, in order to extract the heat that is generated by the large number of LED chips that are packaged closely together in the LED array(s). The LED array incorporates a metal circuit board (MCB) which provides for the routing of conductive traces to each of the LED strings, while at the same time providing electrical isolation between LED strings. The MCB also provides for high thermal conductivity, to extract heat from the densely-packed LED chips. The MCB LED array substrate, having the thermal conductivity of metal, conducts the heat from the LEDs to the base of the MCB substrate, which is mounted onto a heat sink. The MCB of the present invention is described in more detail in U.S. patent application Ser. No. 12/145,395, filed on Jun. 24, 2008, entitled "A LIGHT EMITTING DIODE SUBMOUNT WITH HIGH THERMAL CONDUCTIVITY FOR HIGH POWER OPERATION".

The present invention utilizes a heat sink, typically finned, that efficiently transfers heat from the base of the LED array's MCB substrate. The heat sink may in some embodiments contain an internal "vapor chamber" in which phase change of a contained liquid (into vapor) is used to maximize heat transfer. The vapor chamber element transfers heat very efficiently to a more traditional finned heat sink.

In some embodiments of the present invention, the heat sink dissipates thermal energy via natural convection, aided by venting of the LED aquarium light's housing. In other embodiments of the present invention, the dissipation of thermal energy from the heat sink is aided by a small electric fan, mounted within the LED aquarium light's housing.

In order to allow for effective use in a variety of aquarium environments, the LED aquarium light may be mounted in a variety of ways. In one embodiment of the present invention, the LED aquarium light, or multiple LED aquarium lights, are mounted by one or more gooseneck clamps to a top edge of the aquarium tank. The flexible gooseneck mounts allow the LED aquarium light(s) to be positioned at different locations above the water of the aquarium, without blocking or covering the surface of the water. Multiple (e.g. two or three) LED aquarium lights can be mounted by gooseneck mounts to a single large aquarium tank, with each light illuminating a portion of the tank, with only minimal reduction of the desirable shimmering effect.

A variety of additional mounting options are also possible, all of which take advantage of the compact size of the aquarium light. These include simply hanging the aquarium light by its power cord, over the top of the aquarium tank, the mounting of one or more aquarium lights onto a bar that in turn mounts across the top of the aquarium tank, a flexible stand mount that positions the aquarium light next to the aquarium tank, and a suction cup mount that attaches the aquarium light to the glass wall or side of the aquarium tank. It is also possible to affix a rigid or flexible light guide to the aquarium light, such that light from the aquarium light is directed along or through the light guide, into the water of the aquarium tank. The light guide may be side-emitting, or end-emitting, such that light from the light guide is directed to a specific location within the aquarium.

In some aquarium lighting applications, it will be desirable to use multiple LED aquarium lights, possibly configured to provide different wavelengths of light, or different overall spectral content. For example, it might be desirable to use one or more LED aquarium lights to replicate natural sunlight, with a separate LED aquarium light intended to replicate moonlight. The two different types of LED aquarium lights could then be operated at different times, or on different timers, to replicate the night/day cycle, or even the monthly lunar cycle. It is also possible to implement a variety of spectral contents into a single LED aquarium light, such that the spectral content of that single light can be varied over time. The combination of multiple LED chips used in one or more arrays can be chosen such that the light emitted by the multiple LED chips in the array as a whole has a higher proportion in intensity in the blue region of the visible spectrum than light emitted by a black body radiator at 6500° Kelvin. This may have the effect of simulating the filtering effect of water on natural light. One example of such combination is one that will provide light that is as a whole at least 50% higher in intensity in the blue region of the visible spectrum than light emitted by a black body radiator at 6500° Kelvin. In some applications, light that is at least 20% higher in intensity in the blue region of the visible spectrum than light emitted by a black body radiator at 6500° Kelvin may provide adequate simulation of the filtering effect of water on natural light. Preferably, light so provided as a whole is at least 20% to 50% higher in intensity in the blue region of the visible spectrum than light emitted by a black body radiator at 6500° Kelvin in at least a portion of a spectrum of 380-470 nm, such as a portion within the range of at least 410 to 460 nm. Preferably, light provided by an array contains components in the 360-410 nm wavelength range.

Figure 1B:
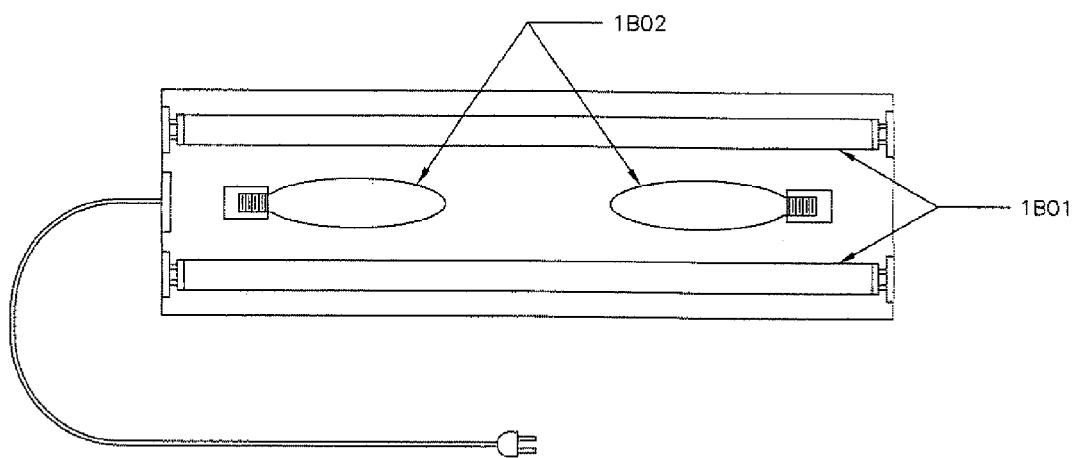

FIGS. 1A and 1B represent one embodiment of the prior art in aquarium lights. Most prior art aquarium lights use either fluorescent bulbs or tubes, or incandescent bulbs, or, in some cases, a combination of fluorescent and incandescent bulbs. FIG. 1A shows a representative aquarium light that uses both fluorescent tubes and incandescent bulbs, mounted to a light hood (1A01) that covers the top of the aquarium. The underside of the light hood is shown in FIG. 1B, including two fluorescent tubes (1B01) and two incandescent bulbs (1B02). The length and width dimensions of a typical aquarium light are in the range of one to four feet, which are comparable to the dimensions of a typical hobbyist aquarium tank. Water attenuates the longer wavelengths of natural sunlight (i.e., the red and yellow wavelengths) more than the blue and green wavelengths. In order to replicate the effect of natural sunlight at a depth of more than a foot or two, it is common practice for aquarium lights to use bulbs with a blue-shifted spectral content (compared to natural sunlight). Aquarium light sources that are intended to replicate moonlight are even more shifted to the blue part of the spectrum. Fluorescent bulbs or tubes for aquarium lighting are available in a variety of spectrums, but don't provide the attractive shimmering effect that incandescent bulbs can provide, due to their More spatially distributed light output. It is also fairly typical for higher-end aquarium lights to provide multiple fluorescent and incandescent bulbs, with separate timers for each, so that a variety of spectral profiles and lighting effects can be programmed at different times. However, this flexibility incurs significant cost and expense, and also results in large aquarium light fixtures that effectively cover all or most of the top surface of the aquarium tank. Aquarium light fixtures that use incandescent bulbs consume relatively large amounts of electrical power, and also radiate large amounts of heat, warming the aquarium water. This may require chillers to avoid overheating of the aquarium water.

LEDs emit light over a fairly narrow range of wavelengths, and so it is possible to tailor the wavelengths of LED aquarium lights to provide the specific spectral content that is desired for aquarium viewing under a variety of conditions, and also to more efficiently promote marine fife growth, including plants, algae, and coral.

Generally speaking, green marine plants make use of photosynthesis processes that are similar to the photosynthesis processes of land plants, although marine plants may be adapted to the blue-shifted spectral content of sunlight that passes through water. Land plants respond primarily to light energy in the wavelengths of 610-700 nm, approximately (red and near-infrared wavelengths), and also in the wavelengths of 400-500 nm, approximately (primarily blue wavelengths). Land plants exposed to intense light in these regions show increased production of Chlorophyll A and B. Blue light triggers morphogenesis processes which cause the plant to morph or change form during some growth phases. Some wavelengths of blue light promote leaf production and vegetative growth and density. Red light provides energy for plant growth, including stem growth and elongation. Red light also encourages some plant reproductive processes, including flowering. Within a wavelength region, different specific wavelengths may be related to the encouragement of specific plant growth patterns and other plant characteristics, in ways that are only beginning to be understood. The ability of LED grow lights to provide specific wavelengths of light leads to increased efficiency of plant growth, and also potentially enables the tailoring of specific plant characteristics. Further, the absence of radiated IR and unintended ultraviolet (UV) wavelengths helps avoid damage to plants, especially when lights are positioned close to the plants.

Less research has been done on the optimal spectral content for encouraging the growth of green marine plants, although it is probable that they are less sensitive to red wavelengths, as these are rapidly attenuated as sunlight passes through water. The ideal spectral content for growing algae (or alternatively, for discouraging algae growth) is also unclear, but is also the subject of ongoing research. Similarly, the ideal spectral content for encouraging coral growth is not fully understood, and coral may also respond to day/night and lunar cycles. In any case, LED aquarium lights allow for the possibility of spectral optimization for encouraging the growth of marine plants, algae, and coral, and also may allow for changing or varying the spectral content over time, in ways that will promote marine life growth.

Figure 2A:
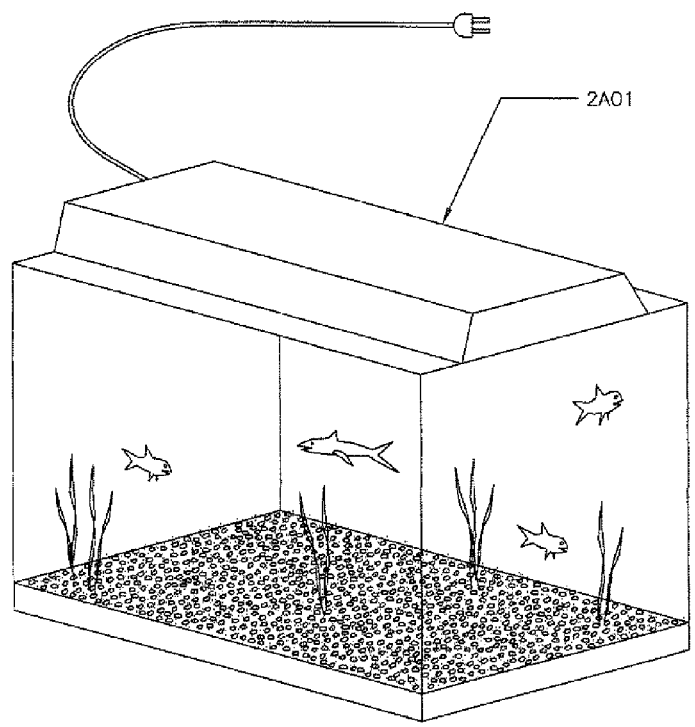
FIGS. 2A, 2B, and 2C are a representation of the prior art in LED aquarium lights, using either a flat light panel or linear light bar arrangement of widely spaced, separately packaged LEDs.
Figure 2B:
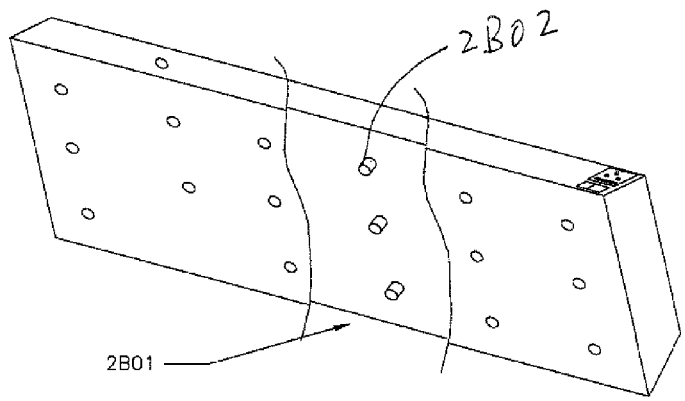
Figure 2C:
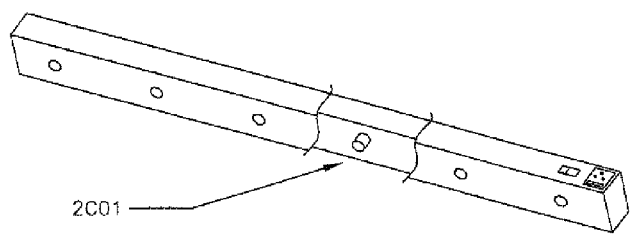

FIGS. 2A, 2B, and 2C show embodiments of the prior art in LED aquarium lights. In the embodiment shown in FIGS. 2A and 2B, multiple individually-packaged, and widely-spaced (multiple inches apart) LEDs are mounted on a large light panel (2A01), with typical length of two to four feet, again matching the length dimensions of typical hobbyist aquarium tanks. FIG. 2B shows the underside of this light panel (2B01). The resulting rectangular arrangement of LEDs (2B02) results in a fairly broad and even spatial distribution of total light output, although the evenness of light distribution is dependent on the reflector design for each LED. It is also possible to arrange the multiple LEDs in a linear pattern, as in the light bar (2C01) shown in the embodiment of FIG. 2C. However, this form will provide a less even distribution of light, that is even more dependent on the reflector design for each LED. Both of these embodiments of the prior art in LED aquarium lights provide for improvements in efficiency over traditional, non-LED aquarium lights. These efficiency improvements are the result of the efficiency of LEDs in converting electrical energy to optical energy, as well as the ability to tailor the spectral content of LED aquarium lights to the wavelength ranges that most efficiently contribute to the growth of marine life.

The embodiments of the prior art in LED aquarium lights, as shown in FIGS. 2A, 2B, and 2C, also have significant disadvantages. Due to the use of multiple separately-packaged and widely-spaced LEDs, typically spaced multiple inches apart, the cost of the packaging of the LEDs, and the cost of the heat-sinking and optics/reflectors needed at each LED location, is relatively high. In order to get sufficient light output, and a relatively even distribution of light, a large fixture is needed, with length and/or width dimensions of two to four feet. In the case of the light panel embodiment shown in FIGS. 2A and 2B, the large rectangular fixture will tend to cover or obscure all or most of the top surface of the aquarium. This blocks viewing of the aquarium from above, and also blocks access for aquarium activities such as feeding, tank cleaning, and other aquarium maintenance tasks. If LEDs of multiple wavelengths or spectral content are used, it will also be difficult to have an even distribution or mixing of the multiple wavelengths when the LED aquarium light is placed just above the top surface of the water of the aquarium, as different wavelengths will be emitting from different, widely-spaced LED locations within the fixture. Different locations within the aquarium tank will therefore receive light with differing spectral content. The spatially distributed light pattern of prior art LED aquarium lights also prevents the desirable shimmering effect.

Figure 3:
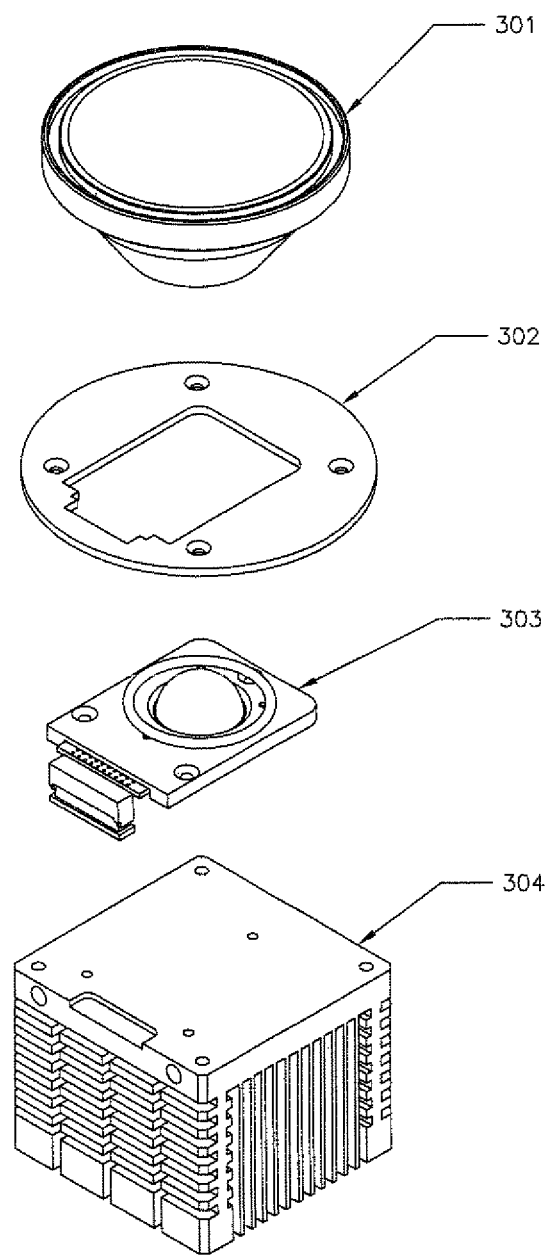
FIG. 3 is a representation of a portion of the present invention, not including the LED aquarium light's mechanical housing and control electronics.

FIG. 3 shows one embodiment of a portion of the present invention. In this embodiment, multiple LED chips without separate individual packaging, either of a single wavelength, or of multiple wavelengths, are mounted into a single, densely-packed LED array (303). Adjacent chips of the array are preferably separated by less than about 0.2 mm, such as 0.1 mm. The LED array is mounted onto a heat sink (304), which may also optionally incorporate a "vapor phase change" element, as described above. The LED chips of the LED array are distributed over an area of a substrate not more than 25 mm in dimensions in any direction, where the dimensions of the area depend on the number of LED chips in the array. Since the surface area of the LED array is relatively small, a single reflector (301) is used for the entire array, mounted on a front plate (302). The front face of the reflector (301), shown facing up in FIG. 3, will typically be covered with a transparent piece of glass, or alternatively, plastic. This transparent cover serves to protect the reflector and LED array, and also to prevent contact with the reflector surface and the LED array's lens. In cases where very good light mixing is required, for improved uniformity of the light output and spectral content, an optical diffuser element may optionally be incorporated, either as a separate element just under the transparent cover, or in place of the transparent cover. The diffuser element may be made of glass or plastic.

FIG. 4A shows a representative embodiment of the LED array used in the present invention, with 21 LED chips. Another embodiment of the LED array uses 50 LED chips. Other embodiments of the LED array may contain fewer than 21 chips, or as many as 100 LED chips. The individual LED chips of the embodiment shown in FIG. 4A are approximately 1 mm×1 mm in size. However, LED chips of other dimensions may also be used, and the diameter of the light-emitting area is therefore a function both of the number of LED chips, as well as the individual chip dimensions. In FIG. 4A, the LED chips are shown as element 401, with each small square representing an individual LED chip. The diameter of the light-emitting area of the array is approximately 8-12 mm for the 21-chip LED array, thereby allowing the LED array to function as an "extended point source". LED arrays with a larger number of chips (up to 100 chips, or even more), or LED arrays that use larger LED chips, may have a somewhat larger light-emitting area, with diameters up to approximately 25 mm. Note that the single lens that is placed over the light-emitting area of the LED array may have a diameter that is slightly larger than the actual light-emitting area, such as a diameter of about 30 mm.

The LED chips within each array are connected electrically into four channels, or potentially more or fewer than four channels, each channel consisting of a series string of multiple LED chips. An LED string or channel is controlled as a single entity, with all LED chips within the series string having an identical electrical current passing through them, and therefore each chip within a string will produce light of similar brightness. Separate electrical connections (402) are provided for each LED string within the array, either in the form of electrical pins (402), or as electrical pads, so that the relative brightness of the different strings can be controlled and varied independently. The LED array shown in FIG. 4A also incorporates an internally-mounted thermistor chip, which is brought out to two of the electrical connections, for the purpose of monitoring array temperature.

In most embodiments of the present invention, the LEDs within a string would be of similar wavelengths. However, different strings might contain LEDs of widely-varying wavelengths. In one embodiment of the LED array, some strings would consist of different wavelengths of blue light, and other strings would consist of blue LEDs with fluorescent phosphors, thereby producing white light of different color temperatures. It is also possible to incorporate LEDs of other colors or wavelengths, such as red, yellow, and green. By separately controlling the electrical current flowing through different LED strings, the relative proportions of the spectral content of each LED string can be varied. Within a particular string, it is still possible to use individual LED chips of multiple wavelengths, although the brightness of the LED chips within a string will be essentially the same. In one embodiment of the present invention, multiple wavelength ranges of blue light (e.g. ~425 nm, ~450 nm, and ~470 nm) could be used in a string, in order to achieve broader coverage of the blue portion of the spectrum. Similarly, blue LEDs with fluorescent phosphors could be used within a string, in order to provide broader-spectrum white light, with a variety of color temperatures.

Figure 5:
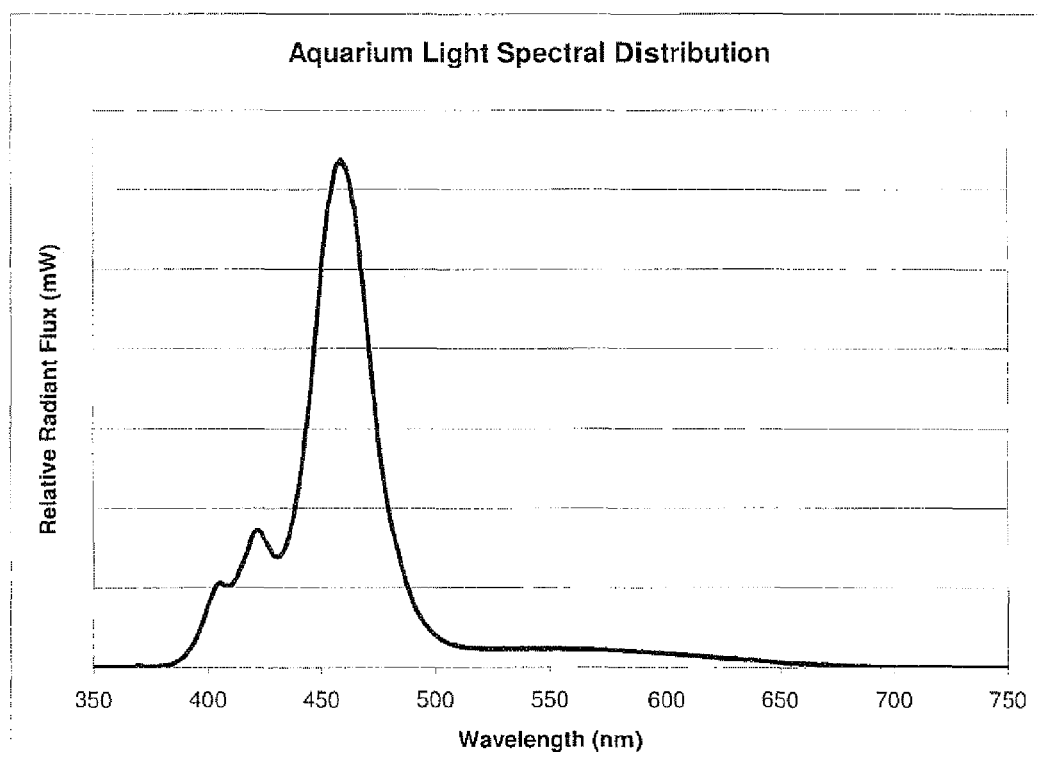
FIG. 5 shows the spectral output of one embodiment of the densely-packed LED array used in the present invention, using LEDs of multiple wavelengths, and fluorescent phosphors.

FIG. 5 shows a representative spectral distribution of light for one such embodiment of the LED array of the present invention, in which multiple wavelengths ranges of blue light are provided, plus an upper ultraviolet (UV) wavelength (~405 nm), as well as broad spectrum white light from blue LEDs with fluorescent phosphors. The peak wavelengths of the blue and UV LEDs can be seen in the figure, as well as the lower intensity "plateau" above 500 nm that is provided by the use of fluorescent phosphors. If ongoing research indicates the value of other specific wavelengths, such as red, yellow, or green visible light, for encouraging specific marine life growth or other attributes, it is possible to incorporate one or more LED chips of those additional wavelengths into the array. Light at upper UV wavelengths may be helpful for coral growth.

Since all of the LEDs of the array are contained within a small area (with a diameter of approximately 12 mm in FIG. 4A), with a single reflector, the mixed spectral content of the LED aquarium light will be directed uniformly over the surface of the aquarium tank, at a typical distance of less than three feet or even at distances of less than a foot. As such, the mixed light output of the entire array can be viewed as coming from an "extended point source", of a small area. With such dimensions of the light emitting area, the light emitted at each of at least two different wavelengths from the array is such that intensities of illumination of different objects in the aquarium at the at least two different wavelengths do not differ by more than 10%, when the different objects being illuminated by the array are at a distance of less than about 3 feet or even 1 foot from the at least one array. Note that the dimensions shown in FIG. 4B are approximate, and may vary with the number of LED chips in the array, the size of the individual LED chips, the specific configuration of LED channels within the array, and also the type of lens used.

Figure 6:
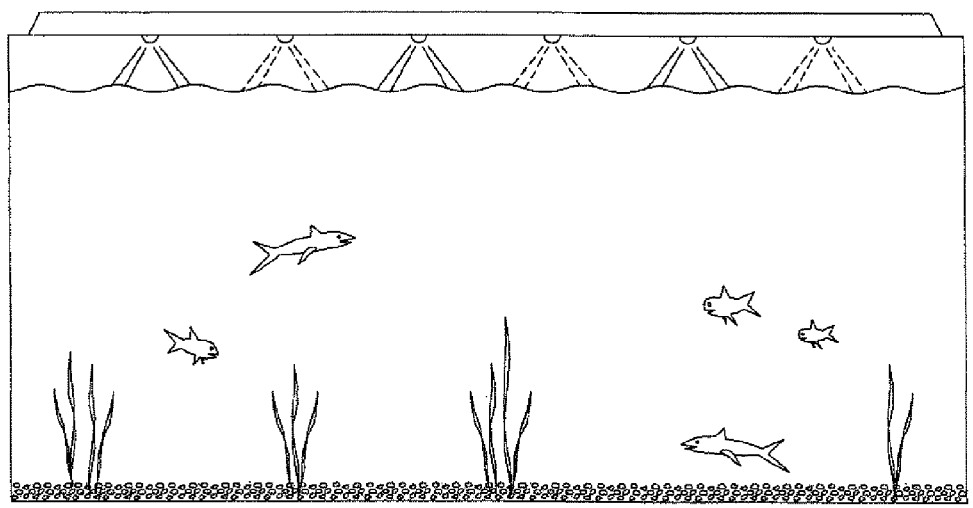
FIG. 6 illustrates the lack of spectral uniformity of one embodiment of the prior art in LED aquarium lights, using separately-packaged, individual LEDs with differing wavelengths or spectral content.

FIG. 6 shows an embodiment of the prior art in LED aquarium lights, in which individually-packaged LEDs of different wavelengths are mounted in separate locations on a light panel or light bar. In this representation, showing just two wavelengths, the light of the two wavelengths (depicted respectively using solid and dashed lines or rays) will be unevenly distributed over the water surface of the aquarium, such that different locations within the aquarium will see different blends of the two wavelengths.

Figure 7:
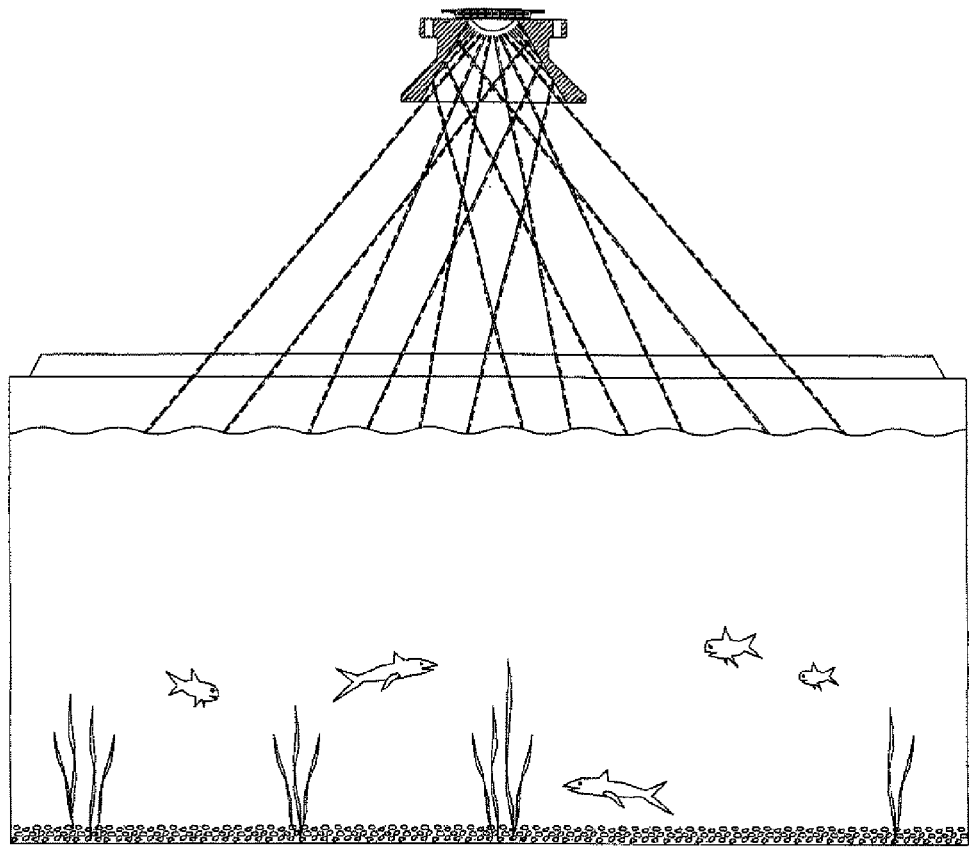
FIG. 7 shows the uniform spectral distribution of one embodiment of the present invention, using a densely-packed LED array containing LED chips of differing wavelengths or spectral content.

FIG. 7 shows an embodiment of the present invention, in which LED chips without individual packaging emitting at least two different wavelengths are packaged at different locations in a densely-packed LED array, of the form shown in either FIG. 4A or FIG. 4B, with a single lens and a single reflector, as discussed below. In this embodiment, the spectral distribution of the at least two wavelengths does not differ by more than 10% and may be substantially identical at different locations within the aquarium, so that all locations within the aquarium will receive light with the same spectral content.

Due to the relatively small light-emitting surface area of the LED array, a single lens can be used as the primary optic. Since LED chips emit light in an upwards direction (with the LED array oriented as in the side view of FIG. 4B), a simple lens element can be mounted on the surface of the LED array. In the embodiment of the LED array shown in FIG. 4B, a commercially-available half-ball lens (HBL) is used (404). In another embodiment of the LED array, a Truncated Ball Lens (TBL) is used, which can be visualized as a half-ball lens in which the base has been ground down to make a "flatter" lens of similar diameter. Either type of lens may be used with LED arrays of different LED chip count, although the diameter of the lens depends on the number of LED chips in the array. The truncated ball lens (TBL) produces a somewhat broader, flatter light distribution pattern, compared to the half-ball lens (HBL).

Figure 8:
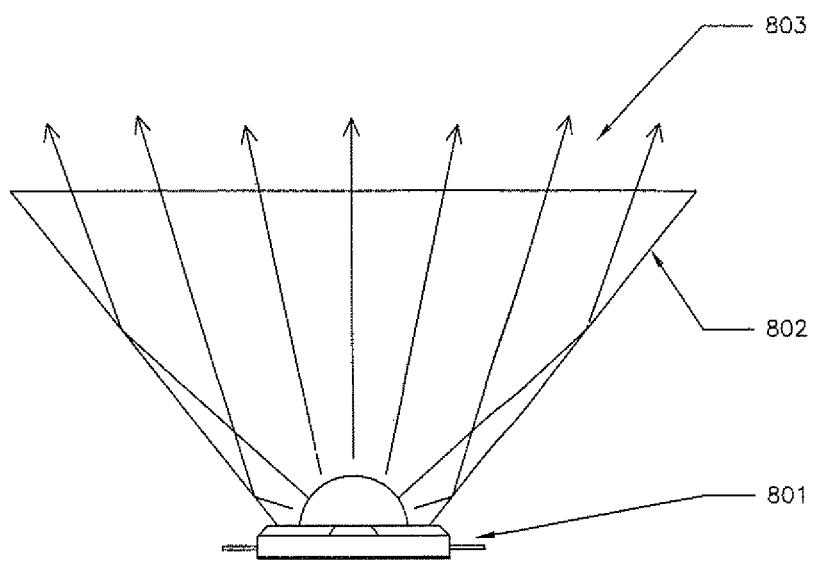
FIG. 8 shows a side view of the 21-chip LED array of the present invention, using one embodiment of a reflector, providing a wide beam pattern.
Figure 9:
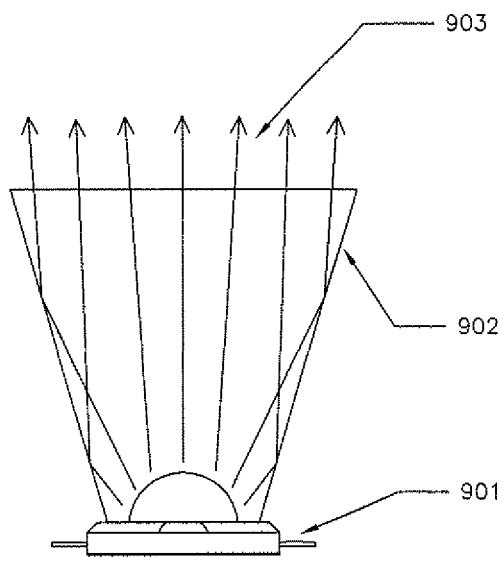
FIG. 9 shows a side view of the 21-chip LED array of the present invention, using another embodiment of a reflector, providing a narrow beam pattern.

In order to provide for a variety of beam patterns, the present invention incorporates a reflector element as a secondary optic. As with the lens element, the small size of the LED array allows a single reflector element to be used, to shape the light output of many LED chips. In FIG. 3, the reflector (301) is attached to a mounting plate (302), such that the reflector is placed just above the LED array (303), with the circular opening at the base of the reflector being flush with the base of the ball lens of the LED array. The shape of the reflector element may be varied to create a variety of beam patterns, with a variety of beam angles. FIGS. 8 and 9 show side views of the 21-chip LED array (801 and 901), with two embodiments of reflectors. In FIG. 8, the reflector (802) is shaped to provide a wider beam angle, as illustrated with the representative light rays (803). In FIG. 9, the reflector (902) is shaped to provide a narrow beam angle, as illustrated with the representative light rays (903). Wide beam angles (such as in a typical "flood light") will allow a single LED aquarium light to illuminate a relatively large area, although the intensity of the light output will diminish more rapidly as the distance from the light source increases. Alternatively, a narrow beam angle (such as in a typical "spot light") will illuminate a relatively smaller area, but the intensity of the light output will diminish more slowly as the distance from the light source increases. A narrow beam angle will therefore result in more uniform illumination between the upper and lower portions of the aquarium, and will penetrate more effectively to the bottom of the aquarium.

Figure 10A:
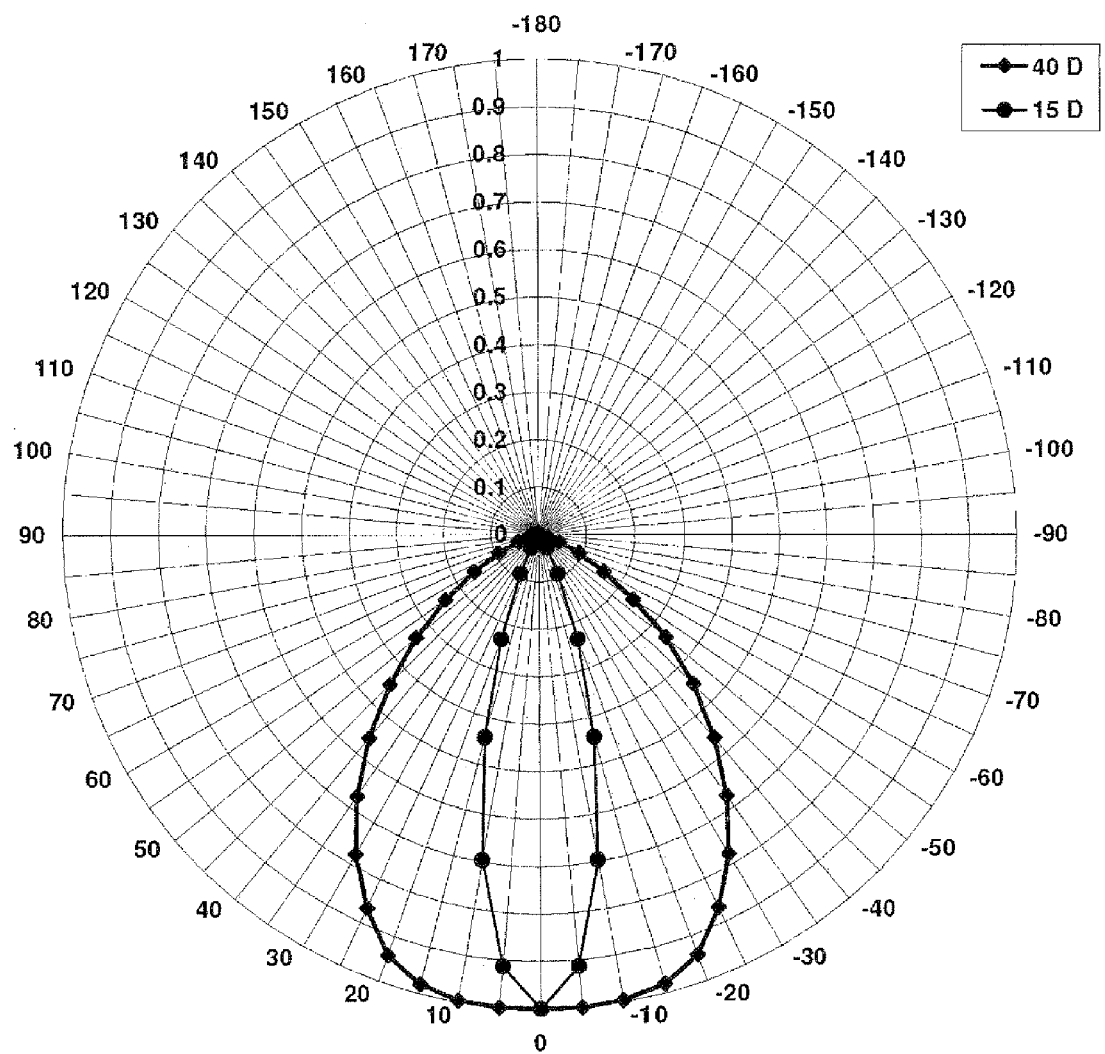
FIGS. 10A and 10B show the spatial light distribution profiles of two embodiments of the reflector used in the present invention as a secondary optic, one providing a wide beam pattern, and the other providing a narrow beam pattern.
Figure 10B:
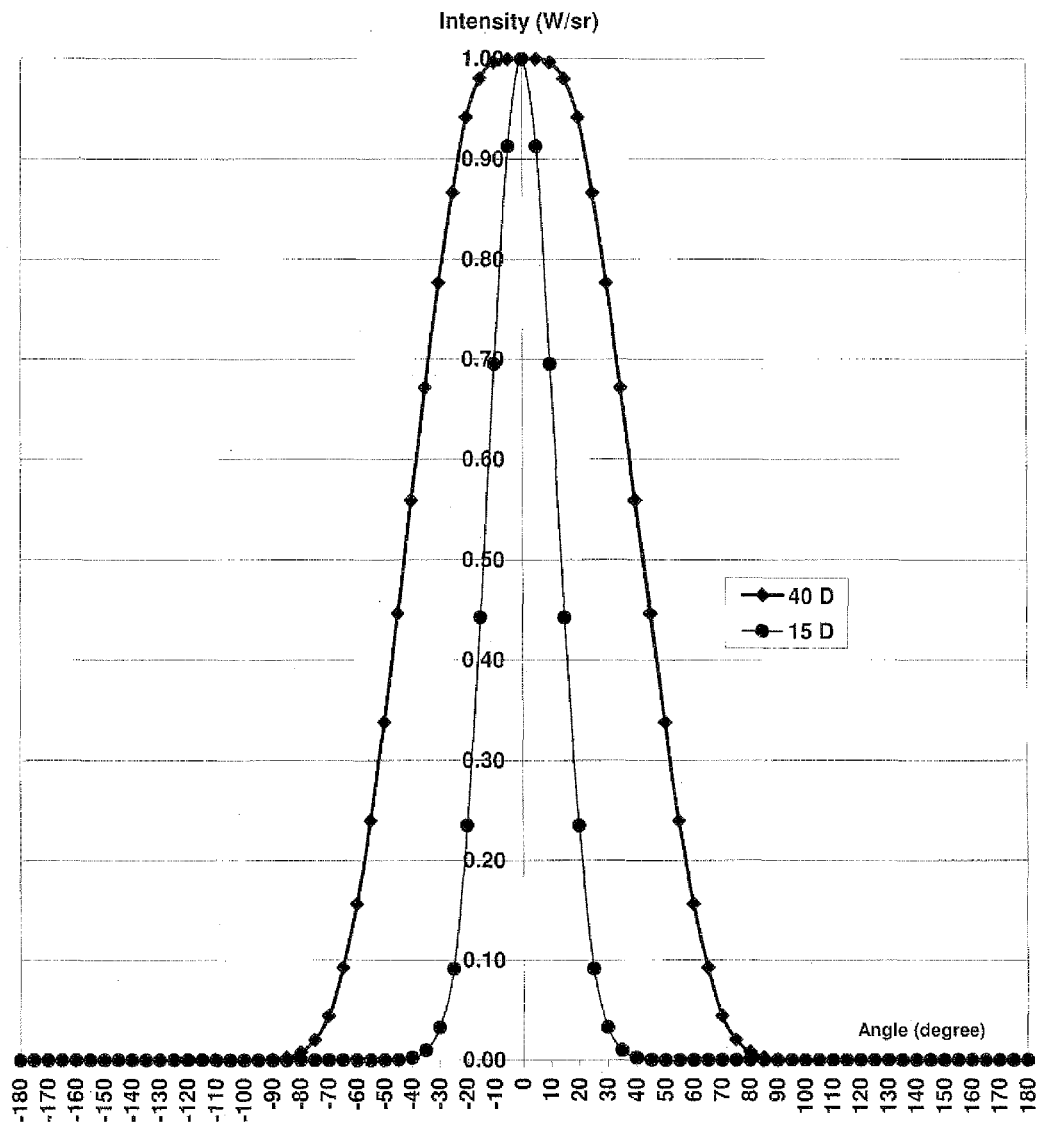

FIGS. 10A and 10B show representative light distribution plots for two different reflector embodiments, one designed for a wider beam angle (approximately 40 degrees), and one designed for a narrower beam angle (approximately 15 degrees). Note that the beam in both cases includes all of the wavelengths that are being emitted by the multiple LED chips of the LED array. The combination of the lens as primary optic, and the reflector as secondary optic, provides good mixing of the multiple wavelengths, ensuring uniform spectral content within the beam. As stated above, the light intensity of the narrower beam will decreases more slowly as the distance from the light source increases, compared to a wider beam. This results in a more even distribution of light intensity at different vertical levels within the aquarium, at the expense of a smaller area of illumination.

Due to the large number of LED chips in the LED array, significant amounts of heat are generated. As discussed above, the LED array incorporates a metal circuit board (MCB) as its substrate, which has a high thermal conductivity and very low electrical conductivity (i.e. it is highly electrically insulative). This MCB is a supporting structure 403 shown in FIG. 4B, without detail. The array of LED chips is bonded to this supporting structure. The MCB substrate provides excellent thermal conductivity from its top surface to its bottom surface, while maintaining a high degree of electrical isolation (i.e. low electrical conductivity, or high insulation). The MCB of the present invention is described in more detail, including its internal structure, in U.S. patent application Ser. No. 12/145,395, entitled "A LIGHT EMITTING DIODE SUBMOUNT WITH HIGH THERMAL CONDUCTIVITY FOR HIGH POWER OPERATION" (Ye, et al.). The MCB of the LED array serves to carry the heat of the LEDs to the base of the array, and from there to the underlying heat sink.

In the embodiment of the present invention shown in FIG. 3, a representative, finned heat sink (304) is used. In other embodiments it is possible to combine the traditional finned heat sink with a "vapor chamber" or "vapor phase change" element, creating a two-stage heat sink assembly. In one such embodiment, the vapor chamber is a commercially-available part, such as the Vapor Chamber thermal device from the Microloops Corporation. Similar products, such as the Celsia NanoSpreader vapor cooler from Intel Corporation, may be used in other embodiments. In both cases, the phase change of a liquid that is contained within the vapor chamber element (into vapor) is used to achieve high thermal conductivity and transfer of heat from the top surface of the vapor chamber, to its bottom surface. The vapor chamber element also serves to spread the heat from the bottom of the LED array, to the much larger area of the bottom surface of the vapor chamber element. This maximizes the thermal effectiveness of the finned heat sink, and allows the use of a larger finned heat sink, with top surface area that is significantly larger than the bottom surface of the LED array. In some embodiments of the present invention, heat dissipation from the finned heat sink (304) is aided by use of a small electric fan.

Figure 11A:
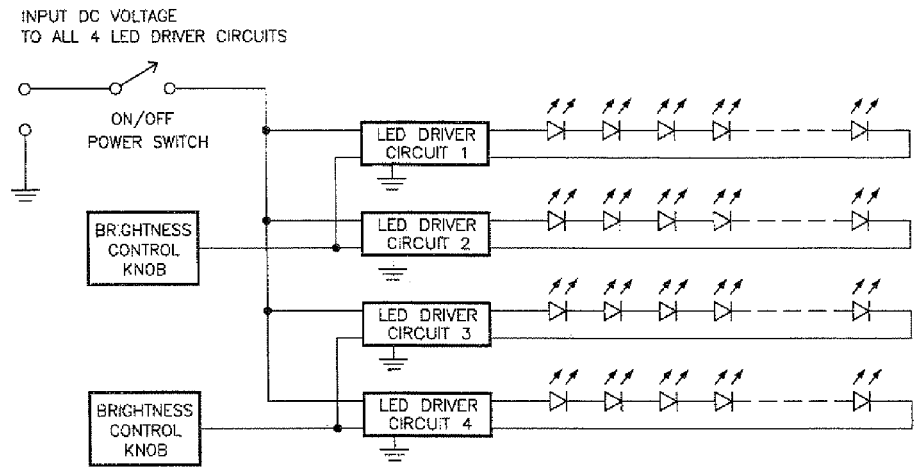
FIG. 11A shows a block diagram of the control electronics of one embodiment of the present invention.

It is common practice to power or drive strings of LED chips using driver circuits that convert a DC voltage to a "constant" DC current. In one embodiment of the present invention, an electronic printed circuit board is used, containing four LED driver circuits. FIG. 11A shows a functional block diagram of one embodiment of this electronic control circuit. Each LED driver circuit converts an input DC voltage to a constant DC current, which is fed to one of the LED strings of the LED array. In one embodiment, the current level for each string is fixed, and is set to a predetermined level of DC current. In other embodiments, one or more control knobs can be used to vary the DC current that is fed to each LED string. A single control knob may be used to vary the DC current to all four LED strings in unison, thereby serving as a simple dimming or brightness control.

In other embodiments, multiple knobs may be used to independently vary the DC current of individual LED strings, thereby controlling both the overall brightness of the LED aquarium light, as well as its spectral content. In one such embodiment, such as is shown in FIG. 11A, one brightness control knob is used to vary the brightness of one or more LED strings made up of predominantly blue LEDs, while a second brightness control knob provides independent control of the brightness of one or more LED strings made up predominantly of blue LEDs with fluorescent phosphors, providing white light of a specific color temperature. By varying the settings of the two control knobs, the relative mix of blue light and white light can be varied, to create differing varieties of "bluish-white" light. For example, different settings of the two knobs could be used to simulate daylight conditions and moonlight conditions. A simple on/off switch is used to turn on or turn off the LED drive circuits. A standard power connector is used to bring in DC voltage from a commercially-available DC power supply. In one embodiment of the present invention, the input power is intended to be 24 Vdc. The current requirement of the power supply is dependent on the number and type of LED chips used in the LED array. In one embodiment, using a 21-chip LED array, the recommended power supply would provide 1.5 amps, at 24 Vdc.

Figure 11B:
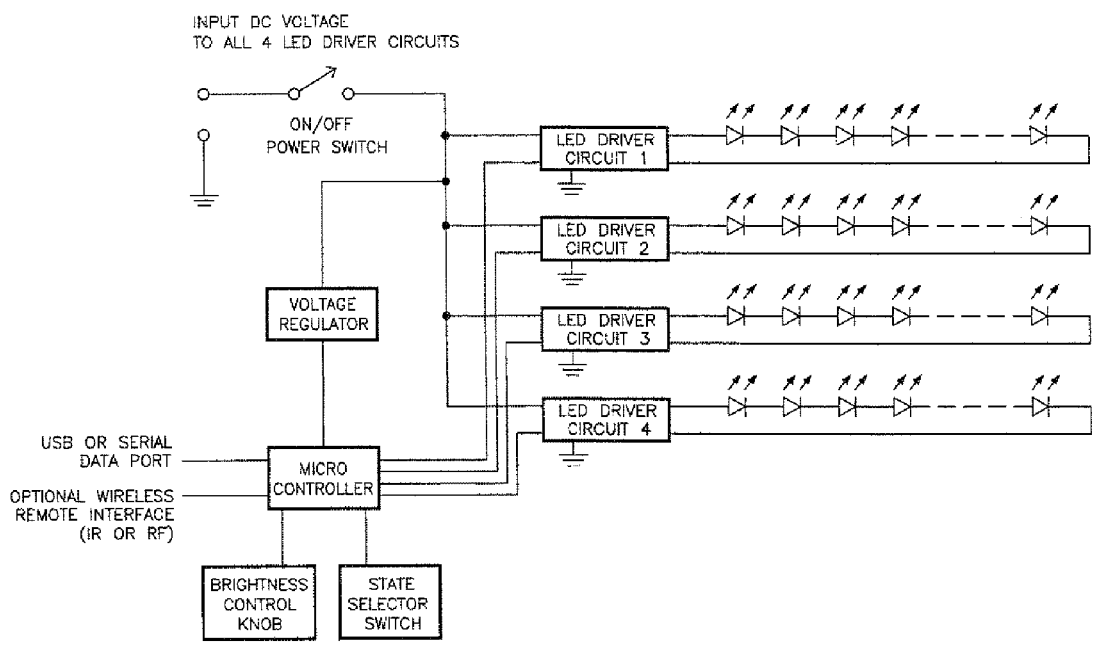
FIG. 11B shows a block diagram of the control electronics of another embodiment of the present invention, using a micro-controller for additional control flexibility.

FIG. 11B shows a block diagram of another embodiment of the electronic control circuit of the present invention. In this embodiment, a micro-controller is used, to allow more sophisticated control of the light output from the multiple LED strings or channels of the LED array. In this embodiment, multiple states of light output can be pre-defined in the micro-controller's embedded software and internal memory, with different LED currents defined for each LED string or channel. This results in a different color mix or spectral content for each state. A selector switch is used to select one of the pre-defined, stored states. A brightness control knob is used to control the overall brightness of the pre-defined "color". Using an LED array with different wavelengths of LED chips in the different LED strings or channels, it would be possible to pre-define light output states that were optimized for specific desired aquarium viewing conditions, or for specific effects related to marine life growth, including marine plants, algae, and coral.

The control circuit shown in FIG. 11B includes an optional USB interface or other serial data port, which could be used for directly controlling the LED aquarium light. This port could also be used for downloading new firmware or embedded software to the micro-controller, including the downloading of new pre-defined light output states. An optional wireless remote interface is also shown, using either an infrared (IR) or radio frequency (RF) remote control. This feature would allow a user of the LED aquarium light to select light output states (including turning the LED aquarium light ON or OFF) from a short distance away from the LED aquarium light. This feature will be useful in situations where the LED aquarium light is not easily accessible or reachable for manual control.

If the micro-controller or the overall control circuit of FIG. 11B is equipped with a real-time clock, then it is also possible to program different spectral content for different times of the day, or even to vary the spectral content by date, season, or lunar cycle. One purpose for this feature would be to better replicate the time-varying spectral content of natural sunlight and natural moonlight. The programming capability could also be used to potentially create an artificial acceleration of time, via a shorter artificial "day", or a shorter artificial lunar month. The programming capability could also be used for potential manipulation of the marine life growing process, and for artificial stimulation or triggering of various effects in marine life growth.

There has been some research into plant growth on land that indicates that a light source that is pulsed on and off, may be more effective than a steady-state light of the same average power, due to the nature of photosynthesis processes, if the frequency and duty cycle of the light pulses is appropriate for the plants being grown. For example, a 10 times brighter light source that is pulsed with a 10% duty cycle, may result in faster plant growth (or other beneficial effects), compared to a steady light of the original brightness. This is discussed in prior-art patent U.S. Pat. No. 5,012,609 (Ignatius et al.). The control electronics of the present invention (either of the embodiments shown in FIGS. 11A and 11B) can easily be configured to implement pulsed operation, if desired. Note that in either of these embodiments, the pulsing would be at some fixed duty cycle. Dimming and brightness control would still be achieved by changing the current level during each fixed-length pulse, rather than by varying the width or duty cycle of the light pulse.

In one embodiment of the present invention, as shown in FIG. 12 with the light output aimed in a downward direction, a small electric fan (the tips of the fan blades are just visible as element 1204) is mounted behind the assembly that consists of the reflector (1201), LED array (1202), and heat sink (1203). Also visible in FIG. 12 are the electronic control printed circuit board (1205), with cable connection to the LED array, and a rear housing plate (1206) that contains the DC electrical power connector (1207), optional on/off switch (not visible), and one or more optional control knobs (not visible). FIG. 13 shows a fully-assembled embodiment of the present invention, including the outer housing of the LED aquarium light. As discussed above, the transparent cover plate (not shown) over the reflector may be a simple piece of glass or other optically transparent material, and serves to protect the surface of the reflector, as well as the LED array and lens that sit at the base of the reflector. In one embodiment of the present invention, a diffusing element may be used as the cover plate, in order to provide an even higher degree of color mixing.

FIGS. 3, 12, and 13 depict an embodiment of the present invention that uses a 21-chip LED array. In this embodiment, the approximate length of the LED aquarium light body is in the range of six to eight inches, with an approximate diameter of three inches, whereas prior-art LED aquarium lights with a similar light output would have length and width dimensions in the range of one to two feet, or more. When using an LED array with a larger number of LED chips, such as the 50-chip array, the larger array size and larger total thermal load require the use of a somewhat larger heat sink, fan, and mechanical housing, although in most respects the construction of such a 50-chip version is very similar to the 21-chip version. The length of the 50-chip embodiment is similar to the length of the 21-chip embodiment. However, the diameter of the 50-chip embodiment of the LED aquarium light is somewhat larger, approximately four to six inches.

The various embodiments of LED aquarium light of the present invention allow for a variety of mounting arrangements, in order to effectively direct the light output of one or more LED aquarium lights onto the top surface of the aquarium tank, or in some cases, to other specific locations within the aquarium tank. In all cases, an objective of the mounting arrangements is to avoid blocking of access to the top surface of the aquarium tank.

Figure 14:
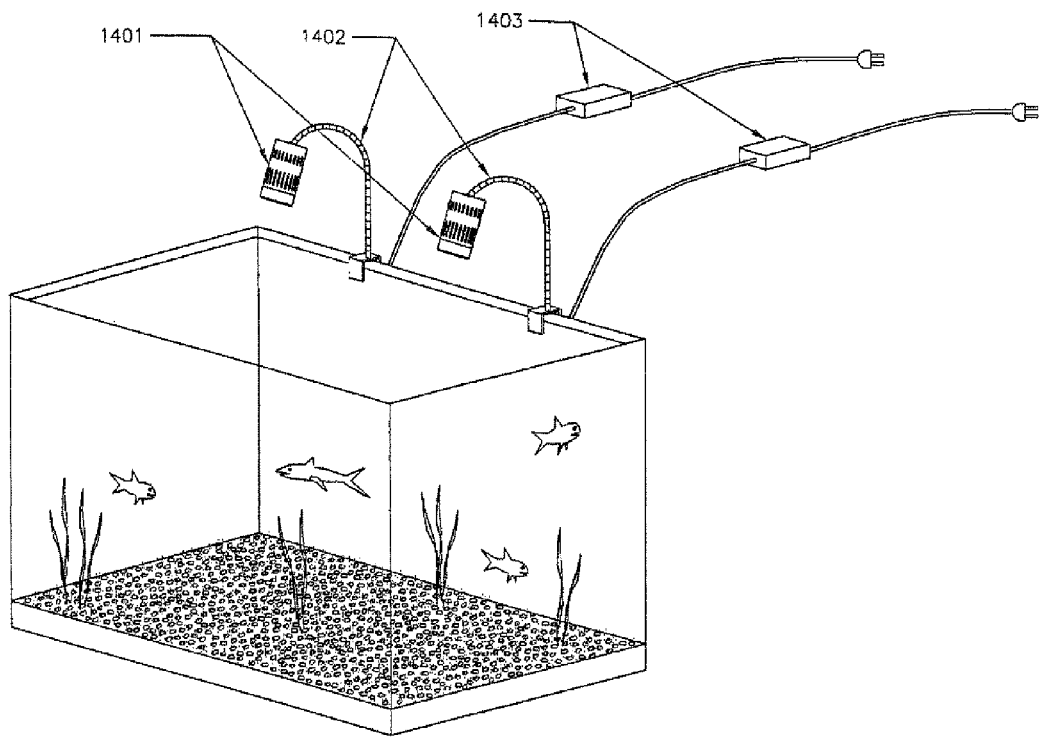
FIG. 14 illustrates another embodiment of the present invention, using a gooseneck mount.

FIG. 14 shows two embodiments of the present invention (1401), each using a single LED array, mounted to the top of the rear tank wall of the aquarium using clamp-on, flexible gooseneck mounts (1402). The flexible gooseneck mounts allow the LED aquarium lights to be positioned appropriately over the top water surface of the aquarium, and allow for some adjustment of the angle of the LED aquarium lights, and of the distance between the light and the water surface. This allows the LED aquarium lights' positions to be adjusted for an attractive shimmering effect, and also to ensure even coverage of the aquarium's surface area. The power supplies (1403) for the aquarium lights are kept out of the way, behind the aquarium. Due to the small size of both the 21-chip and 50-chip embodiments of the LED aquarium light, they do not block viewing of the aquarium from the top, and also do not interfere with activities such as feeding, tank cleaning, and other aquarium maintenance tasks. This represents a significant advantage over the prior art aquarium lights, which effectively cover much of the top surface of the aquarium.

Figure 15:
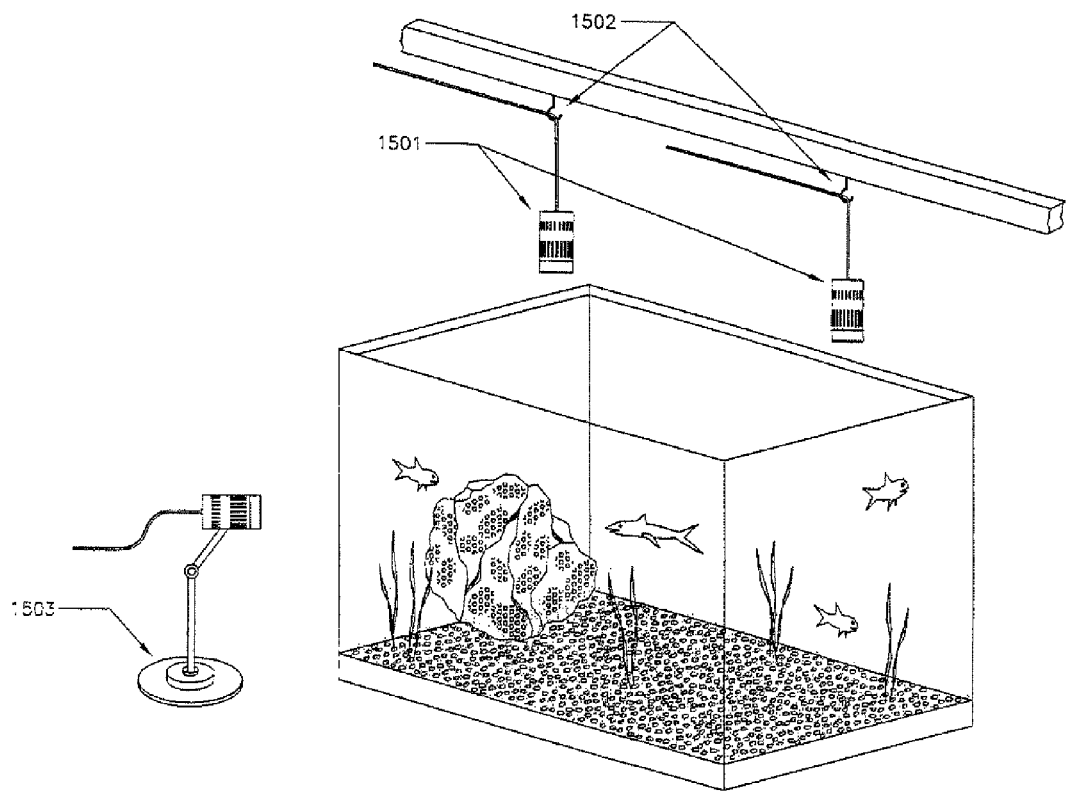
FIG. 15 shows an additional embodiment of the present invention, using hanging mounts and a flexible stand mount.

FIG. 15 shows additional embodiments of the present invention, illustrating additional mounting options. Two aquarium lights (1501) are shown suspended by their power cords, which pass through ceiling hooks (1502). A third aquarium light is shown mounted onto a flexible stand mount (1503), which allows the light to be directed at a specific location within the aquarium tank. One purpose for this sort of stand mount would be to provide supplemental illumination of coral, or marine plants, to encourage their growth.

Figure 16:
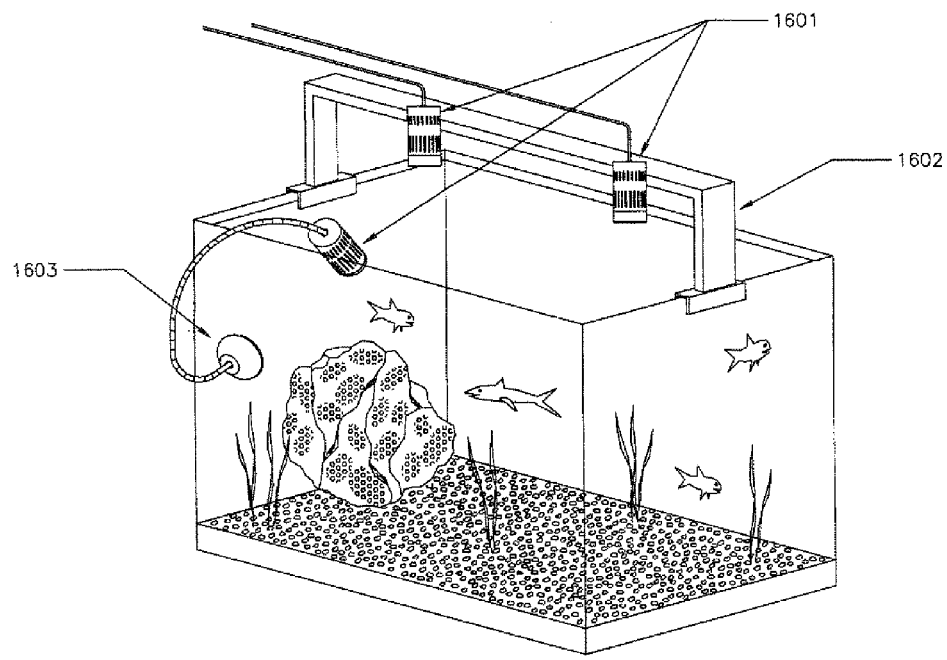
FIG. 16 shows additional embodiments of the present invention, one using a bar mount and another using a suction cup mount.

FIG. 16 shows additional embodiments of the present invention, illustrating additional mounting options. Two aquarium lights (1601) are mounted to a bar (1602), which in turn is clamped across the top of the aquarium tank, such that the level of the horizontal portion of the bar is sufficiently raised above the level of the water in the aquarium. The power cords from the two aquarium lights are secured to the bar to keep them out of the way. A third aquarium light is shown mounted to a suction cup mount (1603), which attaches to the glass side of the aquarium tank. The suction cup mount could be used to direct light to the top surface of the aquarium, or to aim the light through one of the glass walls of the aquarium.

Figure 17:
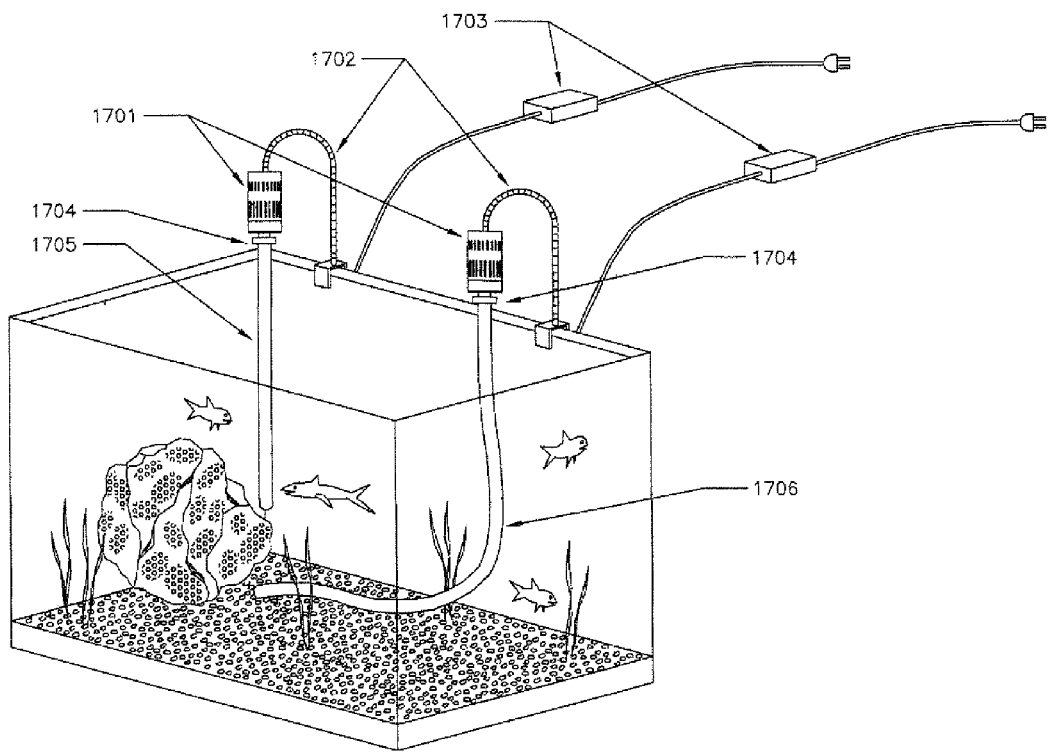
FIG. 17 shows still another embodiment of the present invention, incorporating both rigid and flexible light guides that are submersed into the water of the aquarium, to direct light to specific areas of the aquarium.

FIG. 17 shows additional embodiments of the present invention, using light guides to direct light to specific locations within the water of the aquarium. In these embodiments, the aquarium lights (1701) are equipped with couplers that allow the attachment of light guides. The light guides are made of an optically transparent material, such as glass, or some form of optically transparent plastic. The light guides may include bundled fibers or rods comprising a glass or polymer material.

Light that is coupled from the aquarium light into one end of the light guide will be transmitted or guided through the light guide to its other end. The light guide may be side-emitting, such that the entire length of the light guide is illuminated with light from the aquarium light. The light guide may also be end-emitting, in which case the light from the aquarium light emits only from the other end of the light guide. The light guide(s) may be rigid, or flexible, and may be safely submersed within the water of the aquarium. In FIG. 17, one of the aquarium lights is illuminating a rigid, side-emitting light guide (1705), thereby illuminating a corner of the aquarium tank. The other aquarium light is illuminating a flexible, end-emitting light guide (1706), thereby directing light at a very specific location at the bottom of the aquarium. Note that it is also possible for one aquarium light to be used to illuminate a bundle of light guides, thereby providing directed illumination to multiple locations within the water of the aquarium.

While the invention has been described above by reference to various embodiments, it will be understood that changes and modifications. may be made without departing from the scope of the invention, which is to be defined only by the appended claims and their equivalents.

What is claimed is:

1. A compact LED aquarium light apparatus, comprising:
   at least one array of multiple LED chips without individual packaging, wherein the LED chips are distributed laterally over an area, said LED chips having light emitting surfaces for emitting light in directions transverse to said area, wherein the dimensions of the area do not exceed 25 mm;
   an optical lens adjacent to the light emitting surfaces of the LED chips in said at least one array, wherein light originating from the LED chips of the at least one array is collected and directed by said lens towards an aquarium to illuminate the aquarium and wherein spectrum of light directed by the lens and reaching the aquarium has a higher proportion in intensity in the blue region of the visible spectrum than light emitted by a black body radiator at 6500° Kelvin, simulates filtering effect of water on natural sun light, and also promotes and enhances the growth of various forms of marine life in the aquarium; and
   a reflector surrounding said at least one array reflecting light emitted by the LED chips of the at least one array towards the aquarium.

2. The light apparatus of claim 1, wherein the light emitted by the multiple LED chips as a whole has a higher proportion in intensity in at least a portion of a spectrum of 380-470 nm than light emitted by a black body radiator at 6500° Kelvin.

3. The light apparatus of claim 2, wherein said portion includes at least 410 to 460 nm.

4. The light apparatus of claim 2, wherein said proportion is at least 20% greater than a corresponding proportion for light emitted by a black body radiator at 6500° Kelvin.

5. The light apparatus of claim 4, wherein said proportion is at least 50% greater than a corresponding proportion for light emitted by a black body radiator at 6500° Kelvin.

6. The light apparatus of claim 1, wherein said light emitted by the at least one array includes light in the 360-410 nm wavelength range.

7. The apparatus of claim 1, wherein adjacent chips of said a least one array of multiple LED chips are separated by less than about 0.2 mm.

8. The apparatus of claim 1, said optical lens has a principal plane, wherein dimensions of said optical lens along said principal plane are less than about 30 mm.

9. The apparatus of claim 1, said at least one array comprising LED chips that emit light of at least two different wavelengths or wavelength ranges from different portions of said area, wherein the light emitted at each of the at least two different wavelengths from the at least one array is such that intensities of illumination of different objects in the aquarium at the at least two different wavelengths do not differ by more than 10%, when the different objects being illuminated by the at least one array are at a distance of less than about 3 feet from the at least one array.

10. The apparatus of claim 9, wherein the light emitted is such that the intensities of illumination of different objects in the aquarium at the at least two different wavelengths or wavelength ranges from the at least one array do not differ by more than 10% at distances of less than one foot from the different objects.

11. The apparatus of claim 1, said at least one array comprising separate groups of the LED chips, said apparatus further comprising a plurality of drivers, each of said drivers driving one of said separate groups of the LED chips of the at least one array, to enable light of different intensities to be emitted by the different groups of the LED chips.

12. The apparatus of claim 11, wherein at least two of said groups of the LED chips emit light of different wavelengths or wavelength ranges, so that said drivers control the intensities and spectral range of light emitted by said apparatus.

13. The apparatus of claim 12, further comprising user controls that each enables users to control a corresponding one of said drivers, so that users are enabled to control individually intensities to be emitted by the different groups of the LED chips, and to control the intensities and spectral range of light emitted by said apparatus.

14. The apparatus of claim 11, wherein at least one of said groups of the LED chips emit blue light, UV light, wavelengths of visible light other than blue light, or broad-spectrum white light of different color temperatures.

15. The apparatus of claim 11, further comprising a controller for controlling the plurality of drivers to enable light of one intensity and spectral content to be emitted according to one state of a plurality of different pre-defined user-selectable light output states.

16. The apparatus of claim 15, further comprising a selector switch that enables a user to select a desired state from said plurality of pre-defined user-selectable light output states.

17. The apparatus of claim 16, wherein said selector switch is operable by wireless means.

18. The apparatus of claim 15, said plurality of pre-defined user-selectable light output states including states of light output optimized for specific desired effects related to aquarium viewing, marine life growth, or prevention of specific undesirable marine life effects.

19. The apparatus of claim 18, said specific desired effects including the creation of a shimmering effect within the aquarium, and on the floor of the aquarium tank.

20. The apparatus of claim 18, said specific desired effects including maximum growth of marine plants, algae, and coral.

21. The apparatus of claim 18, said specific desired effects including minimal marine life growth while maintaining marine life health.

22. The apparatus of claim 15, further comprising a USB interface through which pre-defined user-selectable light output states are loaded into said controller.

23. The apparatus of claim 15, further comprising a real time clock wherein said controller is programmable to select from said plurality of pre-defined user-selectable light output states based on time of day, date, lunar cycle, or growing cycles of marine life, based on time of said real time clock.

24. The apparatus of claim 1, further comprising a heat sink with vapor chamber, removing heat from all of the multiple LED chips.

25. The apparatus of claim 1, further comprising one or more drivers supplying current or current pulses to the LED chips.

26. The apparatus of claim 1, further comprising a supporting structure comprising a metal core board (MCB) substrate; said at least one array of LED chips bonded to said supporting structure.

27. The apparatus of claim 1, further comprising a clamp-on, flexible gooseneck mount for supporting on an aquarium wall, one array or multiple arrays, the optical lens, and reflector, that enables the light from the one or more of said arrays above the aquarium.

28. The apparatus of claim 27, wherein said gooseneck mount includes clamps for clamping an upper edge of the aquarium wall so that the one array or multiple arrays, the optical lens and the reflector are located above the aquarium.

29. The apparatus of claim 1, further comprising a bar mount that clamps onto an aquarium tank, supporting one array or multiple arrays, the optical lens, and reflector, that enables the supply of light from above the aquarium.

30. The apparatus of claim 1, further comprising a flexible stand mount for supporting the at least one array, the optical lens, and reflector, enabling the supply of light toward the aquarium from a lateral direction.

31. The apparatus of claim 1, further comprising a suction cup mount for supporting onto an aquarium wall the at least one array, the optical lens, and reflector, enabling the supply of light toward the aquarium.

32. The apparatus of claim 1, further comprising a rigid or flexible light guide element, which couples light from the apparatus into the water of the aquarium.

33. The apparatus of claim 32, said light guide element comprising bundled fiber or rod comprising a glass or polymer material.

34. The apparatus of claim 1, further comprising one or more phosphors on at least some of the LEDs in the array, so that the phosphors and said at least some of the LEDs in the array emit white light.

35. The apparatus of claim 12, further comprising fluorescent phosphor associated with LEDs in a first one of the at least two of said groups of the LED chips emitting blue light, said fluorescent phosphor and the first one group of the LED emit white light, and a second one of the at least two of said groups of the LED chips emit blue light of different wavelengths.

* * * * *